Patented Nov. 10, 1953

2,658,891

UNITED STATES PATENT OFFICE 2,658,891

PREPARATION OF MELAMINE AND/OR GUANIDINE

Johnstone S. Mackay, Old Greenwich, Conn., assignor to American Cyanamid Company, New York, N. Y., a corporation of Maine No Drawing. Application February 6, 1950, Serial No. 142,705

15 Claims. (Cl. 260—249.7)

The present invention relates to the preparation of melamine and/or a guanidine salt by reacting calcium cyanamide, ammonia, and carbon dioxide under heat and pressure.

More particularly, the invention relates to the preparation of melamine and/or a guanidine salt by heating lime nitrogen, ammonia, and carbon dioxide at a pressure of at least 450 p. s. i. and at a temperature of at least 65° C. to produce a reaction mass containing a guanidine salt when the reaction temperature is within the approximate range 65°–250° C., or melamine when the reaction temperature is at least 125° C.

It is an object of the present invention to obtain melamine from calcium cyanamide directly without going through an intermediate step of first isolating cyanamide or dicyandiamide. A further object of this invention is to prepare melamine directly from lime nitrogen. A still further object is to prepare melamine simultaneously from mixtures of lime nitrogen, ammonia, and carbon dioxide.

It is also an object of this invention to prepare guanidine and its salts more cheaply than formerly possible and without danger to the operator. It is a further object to make a product rich in guanidine salts by a novel gaseous reaction of ammonia and carbon dioxide with calcium cyanamide or lime nitrogen, and to recover relatively pure guanidine salts, such as the carbonate and the like, from said product.

Additional objects will become apparent from the discussion hereinafter.

For convenience of discussion the procedure directed mainly to the recovery of melamine will be discussed in a separate section herein, followed by a discussion of the procedure directed mainly to the recovery of a guanidine salt.

(SECTION I), THE MELAMINE PROCESS

Although melamine has been known for many years, the commercially desirable methods for its production have utilized cyanamide or dicyandiamide as starting materials. These latter compounds yield melamine in fair to good yields by polymerization upon heating, either alone or with several different types and kinds of solvents, diluents, catalysts, etc. A few other organic nitrogen compounds, for example, guanidine salts, have been said to yield small percentages of melamine along with various other compounds when heated at temperatures up to about 200° C.

Prior to the present invention, so far as the applicant is aware, no method was known for obtaining melamine directly from calcium cyanamide. By the method of the present invention melamine can be produced more cheaply than by any other known process.

A remarkable feature of the present invention is that yields of melamine exceeding 100 percent, based on the nitrogen available in the calcium cyanamide used, are obtainable. This indicates that the added ammonia and carbon dioxide somehow contribute to the yield. However, the exact chemical mechanisms have not yet been definitely established and the applicant does not wish to be bound by any theory or supposed course of reaction.

The invention may be described in general as follows. Calcium cyanamide is placed in an autoclave and ammonia and carbon dioxide are forced in under pressure. The autoclave is then heated to 300°–400° C., cooled, opened, and the melamine is recovered. It is not required to add ammonia and carbon dioxide as gases; ammonium carbamate, the primary reaction product of dry carbon dioxide and dry ammonia, may be added instead of or in addition to either or both of the gases, since under the reaction conditions carbon dioxide and ammonia, either as such or chemically combined as ammonium carbamate, are equally effective. Consequently, when carbon dioxide and ammonia are referred to hereinafter, it is to be understod that they may be present as ammonium carbamate.

The general features of the invention may be illustrated by the following examples.

*Example 1*

50 grams of calcium cyanamide (86% pure) were reacted with 78 grams of ammonium carbamate and 20 grams of ammonia in a 300 cc. autoclave for 1 hr. at 375° C. The autoclave was cooled, opened, and the reaction product was removed and leached with boiling water. The slurry was filtered and melamine was crystallized from the filtrate. Yield, 21.8 grams.

As the purer forms of calcium cyanamide are expensive, the applicant prefers to use the relatively impure but cheap form known in commerce as lime nitrogen. Lime nitrogen commonly analyzes from 60–65% calcium cyanamide, the remainder being lime, graphite, and other impurities.

Widely varying ratios of reactants may be used in making melamine by the process of this invention. Small quantities of ammonia and carbon dioxide with relatively large quantities of lime nitrogen result in small yields of melamine, and melamine is similarly obtained when the ammonia:carbon dioxide ratio is less than their ratio in ammonium carbamate (2:1). For best results, however, the preferred proportions should be calculated as follows. The initial carbon dioxide:calcium cyanamide ratio is preferably 1.5:1. If lime nitrogen is used instead of a purer calcium cyanamide, additional carbon dioxide is added (in a carbon dioxide:calcium oxide mole ratio of 1:1) to neutralize the free calcium oxide present in the lime nitrogen, whereby the total carbon dioxide:calcium ratio is reduced to about 1.4:1. This ratio will vary with the calcium oxide content of different lots of lime nitrogen, and may readily be determined by those skilled in the art. The lime nitrogen used in making the experiments in developing the present invention analyzed approximately 30.5% calcium present as calcium cyanamide and 13.0% calcium present as calcium oxide, a total of 43.5% calcium. The effect of the carbon dioxide:calcium ratio on the yield of melamine is demonstrated in the following tabulation.

TABLE 1

[Lime nitrogen and ammonium carbamate reacted in autoclave 1 hr. at 350° C.]

| Total CO$_2$:Ca mole ratio | Percent yield of melamine based on total N in lime nitrogen | |
|---|---|---|
| | No ammonia present except that in the ammonium carbamate | Additional ammonia present in 60% stoichiometric excess over that in ammonium carbamate |
| 0.94 | 35.3 | 50.0 |
| 1.32 | | 110.0 |
| 1.45 | | 125.0 |
| 1.57 | 89.0 | 112.0 |
| 1.69 | | 108.0 |
| 1.80 | | 106.0 |
| 1.88 | 71.0 | |
| 2.81 | 70.0 | |
| 4.80 | 20.0 | |

To obtain the best yields, ammonia should be present in excess over the amount in ammonium carbamate. For example, the ammonia:carbon dioxide ratio of 3.2:1 gives a better yield of melamine than the 2:1 ratio available in ammonium carbamate, as may be noted in the foregoing table.

Although there is a certain minimum period of time necessary for the best yields of melamine, for example, about 1 hour when the autoclave is held at about 375° C., a good yield may be obtained simply by bringing the autoclave to reaction temperature (about 350° to about 400° C.), followed by immediate cooling. At the higher temperature, however, the reaction time preferably should not exceed 15 minutes. Beyond that length of time the yield is reduced.

The yield of melamine increases with increased pressure, as demonstrated in the following table. The variation in pressure was obtained by varying the total amounts of reactants, i. e., lime nitrogen, ammonium carbamate, and ammonia charged into a 300 cc. autoclave.

TABLE 2

[Lime nitrogen, ammonia, and carbon dioxide in the Ca:NH$_3$:CO$_2$ mole ratio of about 1:4.8:1.5 reacted in an autoclave at 375° C. for 1 hr.]

| Total weight of reactants | Autoclave pressure, lb./sq. in. | Percent yield of melamine based on total N in lime nitrogen |
|---|---|---|
| 33.5 | 825 | 41 |
| 54 | 1,750 | 59 |
| 65 | 2,250 | 110 |
| 135 | 4,500 | 121 |

Melamine is also formed at pressures of 5000 lbs./sq. in. and even higher.

In the examples cited in Table 2 the pressures were autogeneously produced. However, the reaction is not restricted to conditions of autogenous pressure. For example, melamine will be obtained if an autoclave containing lime nitrogen is heated above about 125° C. and gaseous ammonia and carbon dioxide similarly heated are forced into the autoclave at a pressure exceeding about 450 lb./sq. in.

Although some melamine is obtained by reacting lime nitrogen, ammonia, and carbon dioxide at the relatively low temperature of 125° C., the best yields are obtained at temperatures in the range of 350°–400° C. The preferred temperature is approximately 375° C.

The following tabulation indicates the influence of temperatures on the yield of melamine.

TABLE 3

[Lime nitrogen, ammonia, and carbon dioxide in Ca:NH$_3$:CO$_2$ mole ratio of about 1:5.8:1.8 reacted in autoclave for 1 hr.]

| Temperature, Degrees C. | Percent yield of melamine based on total N in lime nitrogen |
|---|---|
| 125 | 7 |
| 300 | 71 |
| 350 | 106 |
| 375 | 121 |
| 400 | 112 |

The preceding examples were carried out in a 300-cc. autoclave, and the melamine-containing product was removed. The product was leached with boiling water, the slurry was filtered, and melamine was recrystallized from the hot filtrate.

In commercial-scale operations a variety of means for removing melamine from high pressure apparatus can be employed, and those skilled in the art may adapt many of these for removing the melamine formed by the process of the present invention. One such method comprises blowing the reaction product from the autoclave, leaching said product with a suitable solvent, such as hot water, and recrystallizing the melamine from the solvent.

(SECTION II), THE GUANIDINE PROCESS

Various processes for the direct production of guanidine salts from metallic cyanamides have been reported. In one process lime nitrogen is fused with a low melting ammonium salt to yield the corresponding guanidine salt. Under some conditions water is added for increased yields. Although the yields in processes involving ammonium salts have been good, this general method of preparing guanidine salts has the disadvantage of the relatively high cost of ammonium salts as compared with the materials used in the present invention. Also, in making guanidine nitrate by the above-named processes, it has been found that ammonium nitrate tends to react explosively with the graphite contained in lime nitrogen.

It has now been found that a product containing a guanidine salt or mixture of salts, believed to be the carbamate possibly admixed with the carbonate, may be obtained by reacting lime nitrogen directly with ammonia and carbon dioxide gases. The reaction does not require that the ammonia be present in the form of a salt, nor is a solvent or melt required for the reaction. Also by the process of the present invention, dangerous ammonium salts such as the nitrate are not required, and the reaction is conducted safely.

The following examples illustrate the invention.

Example 2

150 grams of lime nitrogen was placed in a 1300-cc. autoclave which was then heated to 150° C., and ammonia gas and carbon dioxide gas in an ammonia:carbon dioxide mole ratio of 2.7:1 were passed into the autoclave under 650 lb./sq. in pressure for 75 minutes. The lime nitrogen increased in weight by 55% and a reaction product was obtained containing guanidine values in a yield of 19.7% of theoretical. The guanidine values were not positively identified, but were believed to be mostly guanidine carbamate. The percent yield is based on the amount of guanidine carbonate obtained from said values. In determining a basis for calculating percentage yields, the usual assumption was made that one mole of calcium cyanamide was converted to one mole of guanidine or a monoacidic guanidine salt, or two moles for a diacidic guanidine salt such as the carbonate.

Guanidine carbonate was recovered from the reaction mass obtained in this and the following examples by leaching the mass with hot water. The guanidine carbamate presumed present would thus be hydrolyzed to guanidine carbonate, which dissolves in the water, and the carbonate may be recovered from its aqueous solution by evaporation or by "salting out" with ethanol and filtering. Other guanidine salts may be obtained by leaching the reaction mass with the corresponding aqueous acid.

Ammonium carbamate is a convenient source of ammonia and carbon dioxide. It need not be mixed with the lime nitrogen, as shown in the following example.

Example 3

A glass cylinder open at both ends approximately 35 mm. in diameter and 200 mm. long was prepared with a porous glass disc in the center. In one half of the tube was placed 30 grams of ammonium carbamate, and in the other half 12 grams of lime nitrogen. The tube with its contents thus separated was placed in a 300-cc. autoclave and 20 grams of ammonia was forced into the vessel. The autoclave was heated for 2 hours at 150° C. The pressure developed was 1000 lbs./sq. in. A reaction mass containing guanidine values as defined in Example 2 was obtained in a yield of 25%.

Accordingly, it is within the scope of the present invention, and the claims are to be so construed, that ammonium carbamate may serve as a source of at least part of the ammonia and carbon dioxide available for reaction with the lime nitrogen. Said ammonium carbamate may be placed in the autoclave as such or may form there (with or without intimate contact with lime nitrogen) by reaction of ammonia and carbon dioxide when these gases are forced into the autoclave, or the carbamate may be present as as a result of both steps.

In order to present a greater reaction surface to the ammonia and carbon dioxide, it is preferred to use a fine-ground calcium cyanamide, as shown in the following two examples.

Example 4

Fifty grams of calcium cyanamide (91.3% pure), 67.0 grams of carbon dioxide, and 72.3 grams of ammonia were forced into a 300-cc. autoclave which was heated for 2 hours at 150° C. under the autogenously produced pressure, yielding a mass from which guanidine carbonate was obtained by leaching with hot water, as in Example 2, the yield being 18% of theory. The screen analysis of the calcium cyanamide used was 41% remaining on a 20-mesh screen, 14.1% on a 40-mesh screen, 28.8% on a 100-mesh screen, and the remainder passing a 100-mesh screen.

Example 5

The preceding example was repeated with the sole difference being that the calcium cyanamide was ground to pass a 200-mesh screen. The yield was 53%.

The reaction may be conducted in various inert solvents, such as methanol or the like. However, no solvent is required and it is preferably omitted if the guanidine is to be recovered as the carbonate.

As relatively pure calcium cyanamide is costly, it is preferable economically to use technical calcium cyanamide, or "lime nitrogen" as it is better known. This material is commercially available in a fine-ground form suitable for the reaction and contains 60–65% calcium cyanamide, the remainder being mostly lime and graphite. The lime nitrogen used in developing this invention contained about 43% total calcium.

In the following examples, which further illustrate the invention, the calcium cyanamide is always present as lime nitrogen, and when calcium is mentioned it includes both that in the calcium cyanamide and that in the accompanying impurities.

Example 6

Lime nitrogen was heated with 76.8 grams of ammonia and 73.3 grams of carbon dioxide for 2 hours in a 300-cc. autoclave at 150° C. The pressure developed was 1350 lb./sq. in. The autoclave was then opened and the reaction mass was removed. The yield of guanidine recovered as the carbonate was 65% of theoretical.

Varying the temperature substantially from that stated in the example decreases the yield of guanidine salt as shown in Table 4 below.

TABLE 4

[The effect of temperature on reacting 73.3 grams of $CO_2$, 76.8 grams of $NH_3$, and 50 grams of lime nitrogen (giving a mole ratio, $CO_2$:Ca of 3:1) in a 300-cc. autoclave for 2 hours.]

| Temperature, °C. | Autogenously-developed pressure, p. s. i. | Yield of guanidine salt,[1] percent of theory |
|---|---|---|
| 65 | 500 | 11 |
| 125 | 1,200 | 57 |
| 150 | 1,350 | 65 |
| 175 | 1,700 | 48 |
| 250 | 2,100 | 6 |

[1] The guanidine salt as initially synthesized was not identified, but probably occurred mostly as the carbamate. Yields recorded are based on guanidine carbonate recovered from said salt.

If the carbon dioxide:calcium ratio is reduced to 1.5:1 instead of 3:1 as in the preceding examples, the yield of guanidine salt is reduced appreciably for the same temperatures, as shown in Table 2. However, some guanidine salt is obtained regardless of what proportions of reactants are used, and the invention is not limited to any specified proportions.

TABLE 5

[The effect of temperature on reacting 73.3 grams of $CO_2$, 76.8 grams of $NH_3$, and 100 grams of lime nitrogen (giving a mole ratio, $CO_2$:Ca of 1.5:1) in a 300-cc. autoclave for 2 hours.]

| Temperature, °C. | Autogenously-developed pressure, p. s. i. | Yield of guanidine salt,[1] percent of theory |
|---|---|---|
| 50 | | 0 |
| 75 | 450 | 4 |
| 125 | 1,275 | 25 |
| 150 | 1,400 | 28 |
| 175 | 1,600 | 25 |
| 200 | 1,800 | 16 |

[1] See definition in Table 4.

In Table 6 below, it is shown further that varying the carbon dioxide:calcium ratio from the optimum value of 3:1 results in decreased yields.

TABLE 6

[The effect of varying the $CO_2$:Ca mole ratio in reacting $CO_2$, $NH_3$, and lime nitrogen in a 300-cc. autoclave for 2 hours at 150° C.]

| $CO_2$:Ca mole ratio (in each run the mole ratio $CO_2$:$NH_3$ is about 1:2.5) | Yield of guanidine salt,[1] percent of theory |
|---|---|
| 1.5:1 | 28 |
| 2.4:1 | 54 |
| 3.0:1 | 65 |
| 6.3:1 | 57 |
| 8.1:1 | 58 |

[1] See definition in Table 4.

Increasing the time of reaction beyond about 4 hours for the lower ratio, carbon dioxide:calcium=1.5:1 does not suffice to increase the yield appreciably as shown in Table 7.

TABLE 7

[The effect of time of reaction on reacting 73.3 grams of $CO_2$, 76.8 grams of $NH_3$, and 100 grams of lime nitrogen (giving a mole ratio, $CO_2$:Ca of 1.5:1) in a 300-cc. autoclave at 150° C. under the autogenously developed pressure.]

| Hours | Yield of guanidine salt,[1] percent of theory |
|---|---|
| ½ | 23 |
| ½ | 25 |
| 2 | 28 |
| 4 | 33 |
| 6 | 33 |

[1] See definition in Table 4.

In Table 8 the effect of increased reaction time on the optimum carbon dioxide:calcium ratio of 3:1 is shown. It will be noted that yields increase rapidly with increase of reaction time up to about 2 hours at 150° C., or about ¼ hour at 175° C., after which longer reaction results in no increase in yield.

TABLE 8

[The effect of time of reaction on reacting 73.3 grams of $CO_2$, 76.8 grams of $NH_3$, and 50 grams of lime nitrogen (giving a mole ratio, $CO_2$:Ca of 3:1) in a 300-cc. autoclave.]

| Hours | Yield of guanidine salt,[1] percent of theory | |
|---|---|---|
| | Reaction at 150° C. under autogenously developed pressure | Reaction at 175° C. under autogenously developed pressure |
| 1/12 | 26 | |
| ¼ | | 56.5 |
| ½ | 45 | |
| 2 | 65 | 48.5 |
| 4 | 59 | |
| 16 | 45 | |

[1] See definition in Table 4.

An ammonia:calcium mole ratio of about 8:1 to 12:1 is preferably employed in techniques using autogenously developed pressures, as will be noted from the following table.

TABLE 9

[The effect of variation of $NH_3$:Ca mole ratio, with $CO_2$:Ca mole ratio constant at 3:1, on heating ammonia, carbon dioxide, and lime nitrogen in a 300-cc. autoclave at 150° C. for 2 hours.]

| Mole ratio $NH_3$:Ca | Autogenously developed pressure, p. s. i. | Yield of guanidine salt,[1] percent of theory |
|---|---|---|
| 3:1 | 1,000 | 40 |
| 6.1:1 | | 62 |
| 8.4:1 | 1,350 | 66 |
| 11.8:1 | 1,700 | 60 |
| 21.7:1 | 1,750 | 69 |

[1] See definition in Table 4.

In all of the preceding examples the autoclave remained sealed during the reaction. However, even better results are obtained when the autoclave is vented continuously or intermittently during the reaction period, especially when the ammonia:calcium mole ratio is increased considerably over that found suitable for non-vented reactions, as shown in the following example.

*Example 7*

150 grams of lime nitrogen, 424 grams of carbon dioxide, and 826 grams of ammonia were heated in a 3-quart autoclave at 150° C., with stirring, for 2 hours. At room temperature the pressure was 160 lb./sq. in., but rose within 10 minutes to nearly 1600 lb./sq. in. when the reaction temperature of 150° C. was reached. Venting was begun immediately and continued at such a rate that within 55 minutes of the start the pressure had fallen to 950 lb./sq. in. Continued venting brought the pressure to 760 lb./sq. in. within 1 hour and 25 minutes of the start, and within 1 hour and 55 minutes the pressure had dropped to 425 lb./sq. in. At the end of 2 hours and 10 minutes, the pressure had dropped to 350 lb./sq. in., and at this point the autoclave was opened and guanidine carbonate recovered from the reaction mass as in the method of Example 2. The yield was 81% of theoretical.

Variations in the venting rate are possible, and may be combined with changes in the proportions of reactants as shown in the following example.

Example 8

200 grams of lime nitrogen, 282 grams of carbon dioxide, and 718 grams of ammonia were heated in a 3-quart autoclave as in the preceding example. The autoclave was vented from 1800 lb./sq. in. to 480 lb./sq. in. over the 2-hour period, and guanidine carbonate was recovered from the reaction mass as in Example 2 in a 77% yield.

When the reaction is conducted at a pressure of about 450–2100 p. s. i. and at a temperature of at least 125° C., both melamine and a guanidine salt are obtained in the reaction mass. These are separated by methods well known in the art. For example, the reaction mass is leached with hot water to dissolve both melamine and to hydrolyze the guanidine salt to the very soluble carbonate. Melamine, being relatively insoluble, especially in cold water, crystallizes out as the filtrate cools, and is recovered. Guanidine carbonate remains in solution and is recovered as described in the Guanidine Process above.

This is a continuation-in-part of applicant's co-pending applications, Serial No. 14,380 and Serial No. 51,110, filed respectively March 11, 1948, and September 24, 1948, both now abandoned.

While the invention has been described with particular reference to specific embodiments, it is to be understood that it is not to be limited thereto but is to be construed broadly and restricted solely by the scope of the appended claims.

I claim:

1. The method comprising heating a reaction mass consisting essentially of calcium cyanamide, ammonia and carbon dioxide at a temperature of at least about 65° C. and a pressure of at least 450 p. s. i. to produce a reaction mass containing at least one member of the group consisting of a guanidine salt and melamine.

2. The process for making melamine which comprises heating a reaction mass consisting essentially of calcium cyanamide, ammonia, and carbon dioxide in a closed reaction zone at a temperature of at least about 125° C. and at a pressure of at least about 450 p. s. i. and recovering the thus-formed melamine.

3. The method according to claim 2 in which the calcium cyanamide is present as lime nitrogen.

4. The method according to claim 3 in which the ammonia and carbon dioxide are initially present at least in part as ammonium carbamate.

5. The method according to claim 2 in which sufficient carbon dioxide is initially present to make the carbon dioxide:calcium cyanamide mole ratio about 1.5:1, and then adding sufficient additional carbon dioxide to neutralize any free calcium oxide present.

6. The method according to claim 2 in which the pressure is autogenously produced.

7. The process that comprises heating a reaction mass consisting essentially of ammonia, carbon dioxide, and calcium cyanamide at a temperature within the approximate range of 65°–250° C. in a closed reaction zone under superatmospheric pressure whereby a substance containing a guanidine salt is produced, and recovering at least the guanidine portion of said salt.

8. The process that comprises heating a reaction mixture consisting essentially of ammonia, carbon dioxide, ammonium carbamate, and calcium cyanamide within the approximate range of 65°–250° C. in a closed reaction zone at superatmospheric pressure whereby a substance containing a guanidine salt is produced, and recovering at least the guanidine portion of said salt.

9. The process that comprises heating a reaction mixture consisting essentially of ammonia, carbon dioxide, and calcium cyanamide at a temperature within the approximate range of 65°–250° C. in a closed reaction zone under the autogenously developed pressure whereby a substance containing a guanidine salt is produced, and recovering at least the guanidine portion of said salt.

10. The method of claim 9 in which the calcium cyanamide is present as lime nitrogen.

11. The process that comprises heating a mixture consisting essentially of ammonia, carbon dioxide, and lime nitrogen in a closed reaction zone at a temperature and pressure within the approximate range of 65° C. and 450 p. s. i. to 250° C. and 2100 p. s. i.

12. The process of claim 11 in which the reaction is conducted for a period of time not exceeding about 4 hours.

13. The process that comprises heating a reaction mass consisting essentially of ammonia, carbon dioxide, and lime nitrogen in the approximate $NH_3:CO_2:Ca$ mole ratio of 12:3:1 in a closed reaction zone at a temperature within the approximate range of 125°–175° C., under the autogenously developed pressure, whereby a substance containing guanidine in combined form is produced, and recovering a guanidine salt from said substance.

14. The process that comprises heating a reaction mass consisting essentially of ammonia, carbon dioxide, and lime nitrogen in a closed reaction zone at a temperature within the approximate range of 125°–175° C. under the autogenously developed pressure, and venting the zone over a period of time.

15. The process of claim 14 in which the $NH_3:CO_2:Ca$ mole ratio is within the approximate range of 20–30:3–7:1.

JOHNSTONE S. MACKAY.

References Cited in the file of this patent

UNITED STATES PATENTS

| Number | Name | Date |
|---|---|---|
| 2,114,280 | Aldred | Apr. 19, 1938 |
| 2,545,480 | Mackay | Mar. 20, 1950 |